United States Patent
Yuyama

(10) Patent No.: US 8,223,255 B2
(45) Date of Patent: Jul. 17, 2012

(54) IMAGING APPARATUS, AUTO-FOCUSING METHOD AND RECORDING MEDIUM

(75) Inventor: Masami Yuyama, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 333 days.

(21) Appl. No.: 12/709,651

(22) Filed: Feb. 22, 2010

(65) Prior Publication Data

US 2010/0220217 A1    Sep. 2, 2010

(30) Foreign Application Priority Data

Feb. 27, 2009  (JP) ................................ 2009-045116

(51) Int. Cl.
*H04N 5/232* (2006.01)
*H04N 5/228* (2006.01)
*H04N 5/208* (2006.01)
*G06K 9/40* (2006.01)
*G03B 17/00* (2006.01)

(52) U.S. Cl. ...................... 348/345; 348/350; 348/222.1; 348/252; 348/538; 382/255; 382/266; 382/242; 382/300; 382/274; 396/82

(58) Field of Classification Search .......... 348/345–356, 348/234, 237, 222.1, 221.1, 239, 249–251, 348/294–304, 277, 280, 311–313, 252, 538; 396/79, 80, 81, 82; 382/254, 255, 242, 266, 382/274, 275, 300
See application file for complete search history.

(56) References Cited

U.S. PATENT DOCUMENTS

| | | | |
|---|---|---|---|
| 5,764,291 A | 6/1998 | Fullam | |
| 7,564,486 B2 | 7/2009 | Ikeda | |
| 2002/0028071 A1* | 3/2002 | Molgaard | ...................... 396/53 |
| 2007/0215791 A1 | 9/2007 | Yamamoto | |

FOREIGN PATENT DOCUMENTS

| | | |
|---|---|---|
| EP | 1 519 560 A2 | 3/2005 |
| EP | 2 091 233 A2 | 8/2009 |

(Continued)

OTHER PUBLICATIONS

Japanese Office Action dated Feb. 24, 2011 (and English translation thereof) in counterpart Japanese Application No. 2009-045116.
Extended European Search Report (EESR) dated Jan. 28, 2011 (in English) in counterpart European Application No. 10154453.4.

(Continued)

*Primary Examiner* — Lin Ye
*Assistant Examiner* — Marly Camargo
(74) *Attorney, Agent, or Firm* — Holtz, Holtz, Goodman & Chick P.C.

(57) ABSTRACT

An imaging apparatus including an imaging function having an imaging section configured such that a plurality of pixels are arrayed in a vertical direction and a horizontal direction, images a subject; a detecting function for detecting whether the imaging apparatus including the imaging section is held vertically or horizontally; a readout function for reading out the pixels information of the plurality of the pixels from the imaging section; a first readout controlling function for controlling a readout process of the pixel information executed by the readout function, in accordance with a detection result from the detecting section; a calculating function for calculating an auto-focus evaluation value in accordance with the pixel information read out by the first readout controlling function; and a focusing function for focusing in accordance with the auto-focus evaluation value calculated by the calculating function.

10 Claims, 13 Drawing Sheets

FOREIGN PATENT DOCUMENTS

| | | |
|---|---|---|
| JP | 10-126682 A | 5/1998 |
| JP | 2006-098676 A | 4/2006 |
| JP | 2006-195023 A | 7/2006 |
| JP | 2006-352716 A | 12/2006 |
| JP | 2010-135904 A | 6/2010 |
| WO | WO 96/10885 A1 | 4/1996 |

OTHER PUBLICATIONS

Japanese Office Action dated May 31, 2011 (and English translation thereof) in counterpart Japanese Application No. 2009-045116.
Korean Office Action dated May 31, 2011 (and English translation thereof) in counterpart Korean Application No. 10-2010-0017892.

* cited by examiner

G: GREEN FILTER
R: RED FILTER
B: BLUE FILTER

PRIOR ART

IMAGING APPARATUS, AUTO-FOCUSING METHOD AND RECORDING MEDIUM

CROSS-REFERENCE TO RELATED APPLICATION

This application is based upon and claims the benefit of priority from the prior Japanese Patent Application No 2009-045116, filed Feb. 27, 2009, the entire contents of which is incorporated herein by reference.

BACKGROUND OF THE INVENTION

1. Field of the Invention

The present invention relates to an imaging apparatus, an auto-focusing method and a recording medium.

2. Description of the Related Art

For example, Japanese Patent Application Laid-Open (Kokai) Publication No. 2006-352716 discloses a technology in which, in an imaging device such as a charge-coupled device (CCD), 2-pixel addition or 4-pixel addition is performed on information of pixels arrayed in a vertical direction to improve imaging performance in dark environments.

However, in the technology described in Japanese Patent Application Laid-Open (Kokai) Publication No. 2006-352716, pixel addition is performed only in the vertical direction. Therefore, sufficient improvement of imaging performance in a dark environment may not be expected depending on an image composition (how a camera is held, and whether an image is imaged horizontally or vertically) when contrast-based auto-focusing is performed.

In general, subjects, such as humans, often include vertical contour lines rather than horizontal contour lines. To successfully perform contrast-based auto-focusing operations in a dark environment on a subject such as this, numerous vertical line components constituting the subject are required to be detected with high contrast.

For example, in an ordinary image composition in which the camera is held horizontally (referred to, hereinafter, as a horizontal imaging), as a result of "vertical pixel addition", pixel addition readout is performed on vertical-direction pixels information having few contrast components to brighten an image. Information of the horizontal-direction pixels including numerous information (contrast components) required to perform auto-focusing (AF) is readout from all pixels. As a result, the vertical contour lines included in the subject are detected with high contrast, allowing auto-focusing operations to be successfully performed.

However, in the technology described in Japanese Patent Application Laid-Open (Kokai) Publication No. 2006-352716, pixel addition is performed only in the vertical direction. Therefore, in an image composition in which the camera is held vertically (referred to, hereinafter, as a vertical imaging), the contour lines included in the subject and the pixel addition direction match, and as a result, pixel addition readout is performed on the vertical-direction pixel information including numerous information (contrast components) required to perform AF. Accordingly, there is a problem in that, although the image is brightened, the contour lines included in the subject are not detected with high contrast.

SUMMARY OF THE INVENTION

The present invention has been conceived to solve the above-described problems. An object of the present invention is to provide an imaging apparatus and an auto-focusing method allowing consistent improvement in the auto-focusing precision of imaging in a dark environment regardless of image composition, by selectively performing pixel addition in a vertical direction and a horizontal direction.

In order to achieve the above-described object, in accordance with one aspect of the present invention, there is provided an imaging apparatus comprising: an imaging section configured such that a plurality of pixels are arrayed in a vertical direction and a horizontal direction, images a subject; a detecting means for detecting whether the imaging apparatus including the imaging section is held vertically or horizontally; a readout means for reading out the pixels information of the plurality of the pixels from the imaging section; a first readout controlling means for controlling a readout process of the pixel information executed by the readout means, in accordance with a detection result from the detecting section; a calculating means for calculating an auto-focus evaluation value in accordance with the pixel information read out by the first readout controlling means; and a focusing means for focusing in accordance with the auto-focus evaluation value calculated by the calculating means.

In accordance with another aspect of the present invention, there is provided an imaging apparatus comprising: an imaging section configured such that a plurality of pixels are arrayed in a vertical direction and a horizontal direction, images a subject; a contrast detecting means for detecting contrast of vertical direction and horizontal direction of an image imaged by the imaging section; a readout means for reading out the pixels information of the plurality of the pixels from the imaging section; a second readout controlling means for controlling a readout process of the pixel information executed by the readout means, in accordance with a detection result from the contrast detecting means; a calculating means for calculating an auto-focus evaluation value in accordance with the pixel information read out by the second readout controlling means; and a focusing means for focusing in accordance with the auto-focus evaluation value calculated by the calculating means.

In accordance with another aspect of the present invention, there is provided an auto-focusing method of imaging apparatus including an imaging section configured such that a plurality of pixels are arrayed in a vertical direction and a horizontal direction, images a subject, comprising: a detecting step of detecting whether the imaging apparatus is held vertically or horizontally; a readout step for reading out the pixels information of the plurality of the pixels from the imaging section; a first readout controlling step of controlling a readout process of the pixel information executed in the readout step, in accordance with a detection result in the detecting step; a calculating step of calculating an auto-focus evaluation value according to the pixel information read out in the first readout controlling step; and a focusing step of focusing in accordance with the auto-focus evaluation value calculated in the calculating step.

In accordance with another aspect of the present invention, there is provided an auto-focusing method of imaging apparatus including an imaging section configured such that a plurality of pixels are arrayed in a vertical direction and a horizontal direction, images a subject, comprising: a detecting step of detecting contrast of vertical direction and horizontal direction in an image imaged by the imaging section; a readout step for reading out the pixels information of the plurality of the pixels from the imaging section; a second readout controlling step of controlling an readout process of the pixel information executed in the readout step, in accordance with a detection result in the detecting step; a calculating step of calculating an auto-focus evaluation value in accordance with the pixel information read out in the second readout controlling step; and a focusing step of focusing in accordance with the auto-focus evaluation value calculated by the calculating step.

In accordance with another aspect of the present invention, there is provided a computer-readable storage medium having stored thereon a program that is executable by a computer in an imaging apparatus including an imaging section configured such that a plurality of pixels are arrayed in a vertical direction and a horizontal direction, images a subject, the program being executable by the computer to perform a process comprising: detection processing for detecting whether the imaging apparatus including the imaging section is held vertically or horizontally; readout processing for reading out the pixels information of the plurality of the pixels from the imaging section; first readout control processing for controlling a readout process of the pixel information executed by the readout processing, in accordance with a detection result of the detection processing; calculation processing for calculating an auto-focus evaluation value in accordance with the pixel information read out by the first readout control processing; and focus processing for focusing in accordance with the auto-focus evaluation value calculated by the calculation processing.

In accordance with another aspect of the present invention, there is provided a computer-readable storage medium having stored thereon a program that is executable by a computer in an imaging apparatus including an imaging section configured such that a plurality of pixels are arrayed in a vertical direction and a horizontal direction, images a subject, comprising: readout processing for reading out the pixels information of the plurality of the pixels from the imaging section; contrast detection processing for detecting contrast of vertical direction and horizontal direction of an image imaged by the imaging section; second readout control processing for controlling a readout process of the pixel information executed by the readout processing, in accordance with a detection result of the contrast detection processing; calculation processing for calculating an auto-focus evaluation value in accordance with the pixel information read out by the second readout control processing; and focus processing for focusing in accordance with the auto-focus evaluation value calculated by the calculation processing.

In the present invention, vertical-direction pixel addition and horizontal-direction pixel addition are selectively performed. Therefore, the precision of auto-focusing is consistently enhanced during imaging in a dark environment regardless of image composition.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings, using a digital camera as an example.

Figure 1A:
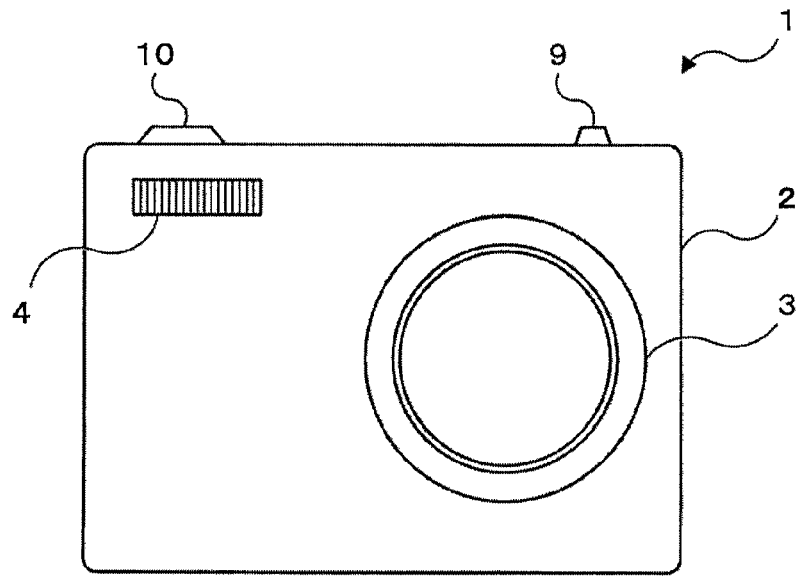
FIG. 1A is a front view of an outer, appearance of a digital camera.
Figure 1B:
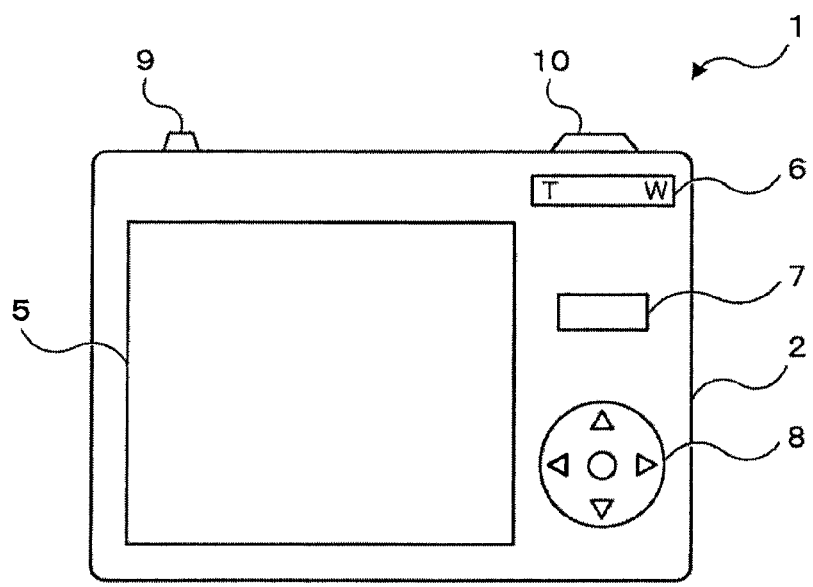
FIG. 1B is a rear view of the outer appearance of the digital camera.

FIG. 1A and FIG. 1B are outer appearance views of a digital camera 1. FIG. 1A is a front view, and FIG. 1B is a rear view.

In FIG. 1A and FIG. 1B, the digital camera 1 is configured such that a lens tube 3 and a strobe light 4 are arranged on the front surface of a body 2 that is suitably shaped so that the digital camera 1 can be hand-held, and a display section 5 including a liquid crystal display, a zoom key 6, a function key 7, and a cursor key 8 are arranged on the back surface of this body 2. In addition, a power switch 9 and a shutter key 10 provided with a half-shutter function are arranged on the top surface of the body 2. Note that, although this configuration is that of a compact digital camera, it is not limited thereto and may be, for example, that of a digital single-lens reflex camera, a camera mounted on a mobile phone or other electronic devices, or a digital video camera.

Figure 2:
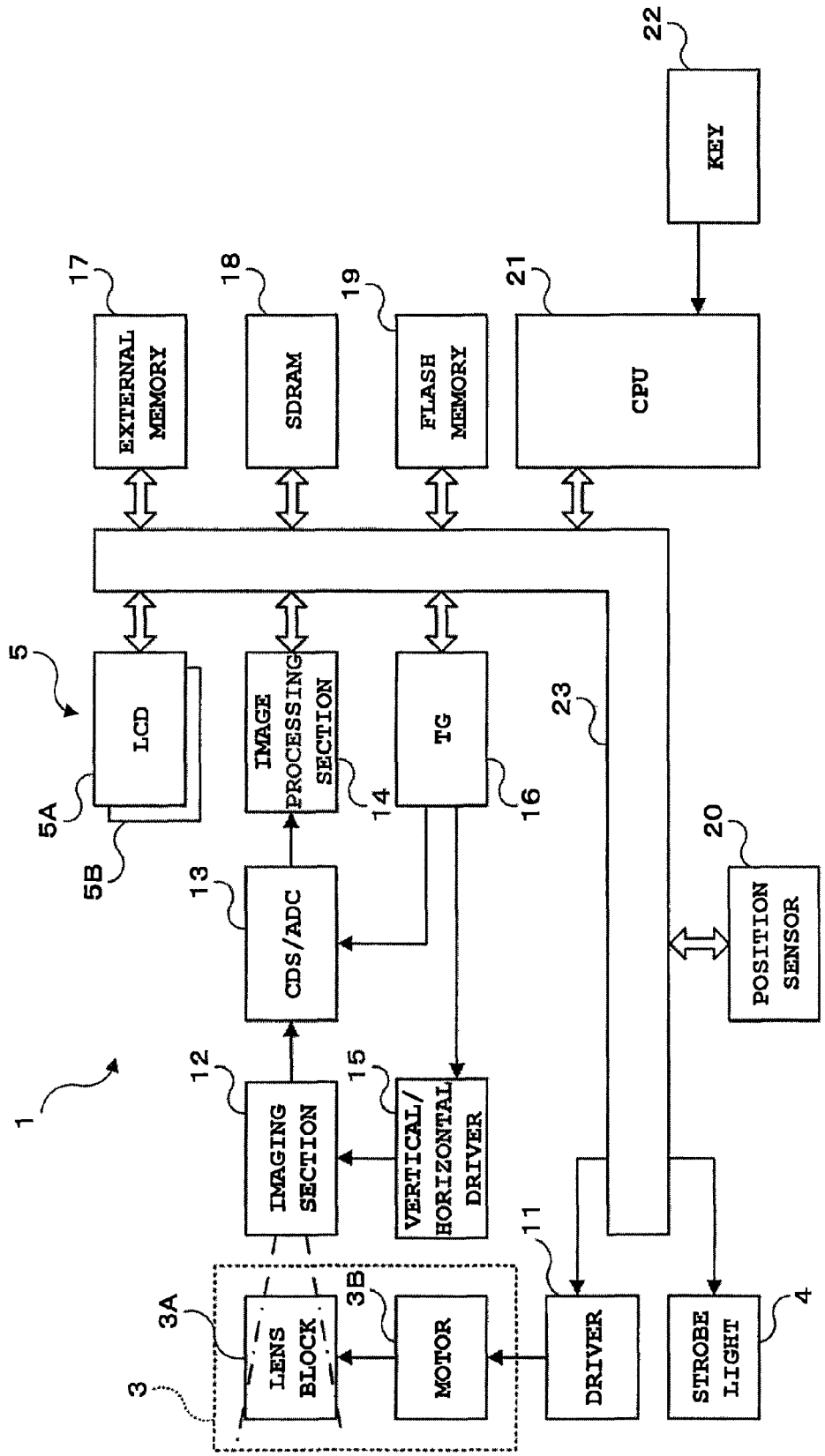
FIG. 2 is a block diagram showing a configuration of a digital camera 1.

FIG. 2 is a block diagram showing the configuration of the digital camera 1.

In FIG. 2, the digital camera 1 includes the lens tube 3, a motor driver 11 (focusing means), the strobe light 4, an imaging section 12, a correlated double sampling/analog-to-digital conversion section (CDS/ADC) 13, an image processing section 14, a vertical/horizontal driver 15, a timing generator (TG) 16, an external memory 17, a synchronous random access memory (SDRAM) 18, a flash memory 19, a position sensor 20, a microcomputer unit (central processing unit [CPU]) 21, a key input section 22, a bus line 23, and the like.

Each section will be described in detail. First, the lens tube 3 includes a lens block 3A housing a plurality of imaging lenses of which the optical axes are aligned and a motor 3B. The motor 3B is an actuator used to focus the lens block 3A and is operated by power received from the motor driver 11. The motor driver 11 generates and outputs power for driving the motor 3B in response to a focus controlling command given accordingly from the CPU 21 via the bus 23.

Here, focusing of the lens block 3A refers to so-called auto-focusing. In auto-focusing, when signals of a frame image for checking composition (also referred to as a live-view image) are outputted from the imaging section 12 described hereafter, the position on an optical axis of a focus lens within the lens block 3A is finely adjusted in forward and backward directions by a contrast detecting method (a method in which the lens block 3A is judged to be focused when contrast within a specific area of an image is most defined) in response to a half-shutter operation (half-depression operation of the shutter key 10) by a user, such that a subject within a specific area of the live-view image (such as near the center of the image) is in focus.

The lens tube 3 may be provided with a zoom function. In other words, the lens tube 3 may include a zoom lens, a zoom motor for moving the zoom lens, and a driver for the zoom motor. However, because these components are not directly related to the present invention, they are omitted from the embodiment.

The imaging section 12, which includes a two-dimensional image sensor such as a CCD, is arranged on the optical axis of the lens tube 3A and outputs analog imaging signals according to an optical image of a subject formed through the lens tube 3. The vertical/horizontal driver 15 generates and outputs, in response to timing signals from the timing generator 16, various signals (readout signals, vertical transfer clock, horizontal transfer clock, etc.) used to control imaging operations of the imaging section 12.

The CDS/ADC 13 is a circuit that converts analog imaging signals according to the optical image of a subject outputted from the imaging section 12 into digital signals, and includes, for example, a CDS that holds inputted imaging signals, a gain adjusting amplifier (automatic gain control [AGC]) that amplifies imaging signals in accordance with automatic exposure adjustment processing (automatic exposure [AE]) and the like, and an analog-to-digital converter (ADC) that converts amplified imaging signals into digital imaging signals.

The image processing section 14 is a circuit that performs various image processing (such as gamma processing) on digital imaging signals outputted from the CDS/ADC 13.

The display section 5 includes a liquid crystal display (LCD) 5A having a predetermined aspect ratio (such as 16:9), a driver, and a backlight 5B. When display signals and driving control signals for driving the driver are inputted, the display section 5 displays an image according to the display signals in a lower layer as a live-view image and displays messages outputted from the CPU 21, icons, and the like in an upper layer.

The position sensor 20 (detecting means) detects an image composition of the digital camera 1. There are two image compositions: one is a "horizontal image composition" in which an image is imaged with the digital camera 1 being held horizontally, and the other is a "vertical image composition" in which an image is imaged with the digital camera 1 being held vertically. As the position sensor 20 capable of differentiating and detecting horizontal imaging and vertical image compositions, a gravity sensor may be used, for example. Here, the direction of gravitational force on the body 2 of the digital camera 1 when horizontal imaging is performed is a direction from the top surface to the bottom surface of the body 2. When the image composition is changed to vertical image composition, the direction of gravitational force changes by roughly 90 degrees from that of horizontal image composition. Since the direction of gravitational force differs between horizontal imaging and vertical imaging as just described, the gravity sensor may be used to detect image compositions.

The key input section 22 is a circuit that generates operating signals for various types of buttons (such as the zoom key 6, the function key 7, the cursor key 8, and the shutter key 10) arranged in each portion of the body 2.

The CPU 21, which is a single-chip microcomputer unit (referred to as a computer in the present specification simply) performing integrated control of each section of the digital camera 1, controls each section of the digital camera 1 by reading out control programs stored in advance in the flash memory 19 to the SDRAM 18 and running the control programs in the SDRAM 18, and performs, for example, AE control processing according to luminance information included in imaging signals, AF control processing using a contrast detecting method, and imaging mode processing, described hereafter.

Here, the CPU 21 actualizes functions of a readout means, a first readout controlling means, a calculating means, a judging means, a contrast detecting means, a first addition readout controlling means, a second addition readout controlling means, a second readout controlling means, a third addition readout controlling means, and a fourth addition readout controlling means.

The SDRAM 18 functions as a work memory (a working area used to run the control programs) of the CPU 21 and as a buffer memory temporarily storing therein image signals for a plurality of images outputted from the CDS/ADC 13.

The external memory 17 records and stores therein image files that have been imaged. This external memory 17 may be detachable, such as a memory card.

Next, the configuration of the imaging section 12 will be described.

Figure 3:
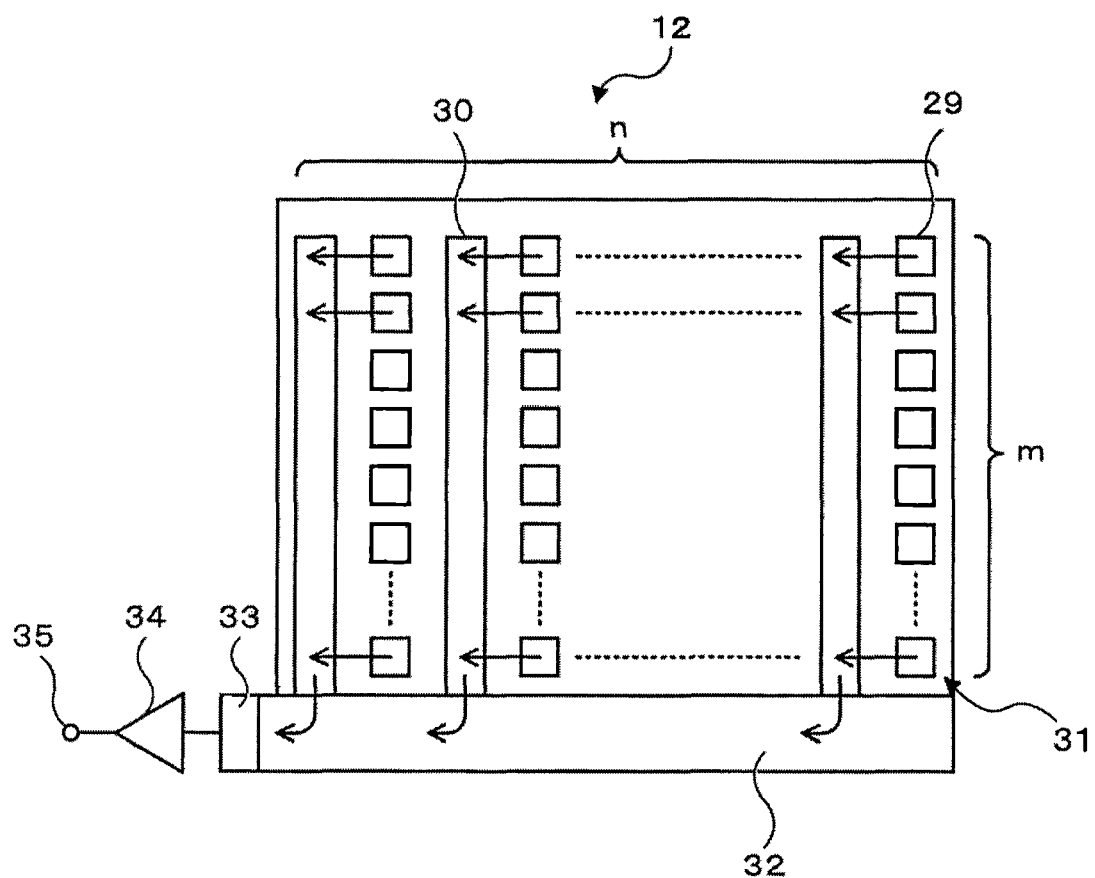
FIG. 3 is a conceptual diagram showing a configuration of an imaging section 12.

FIG. 3 is a conceptual diagram showing the configuration of the imaging section 12. Here, a configuration of a CCD having a pixel array of n-columns and m-rows is shown. As shown in FIG. 3, in the imaging section 12, n×m-number of photoelectric conversion elements (referred to as pixels 29) storing electrical charge corresponding to an amount of incident light is arrayed two-dimensionally, forming a matrix. In addition, a vertical transferring section 30 (also referred to as a vertical CCD) is arranged between each column of pixels 29, forming an imaging area 31. Furthermore, a horizontal transferring section 32 (also referred to as a horizontal CCD) is arranged below the imaging area 31 in FIG. 3. Depending on the configuration, the imaging area 31 may be divided into a lower area and an upper area, and a horizontal transferring section may be provided for each area.

In response to a readout signal from the vertical/horizontal driver 15, signal charges collected in the pixels 29 are simultaneously loaded into an adjacent vertical transferring section 30, and then sequentially transferred within the vertical transferring section 30 in a downward direction in FIG. 3, synchronously with a vertical transfer clock from the vertical/horizontal driver 15.

The output ends of all vertical transferring sections 30 are connected to the horizontal transferring section 32, and signal charges for a single line are sequentially loaded into the horizontal transferring section 32, synchronously with a vertical transfer clock. The signal charges loaded into the horizontal transferring section 32 are sequentially transferred in a left-hand direction in FIG. 3, synchronously with a horizontal transfer clock from the vertical/horizontal driver 15. After reaching an output end of the horizontal transferring section 32, the signal charges are converted to electrical signals by a charge detecting section 33 provided on the same output end. The electrical signals are then amplified by an amplifier 34, and outputted from a terminal 35 as CCD output.

Figure 4:
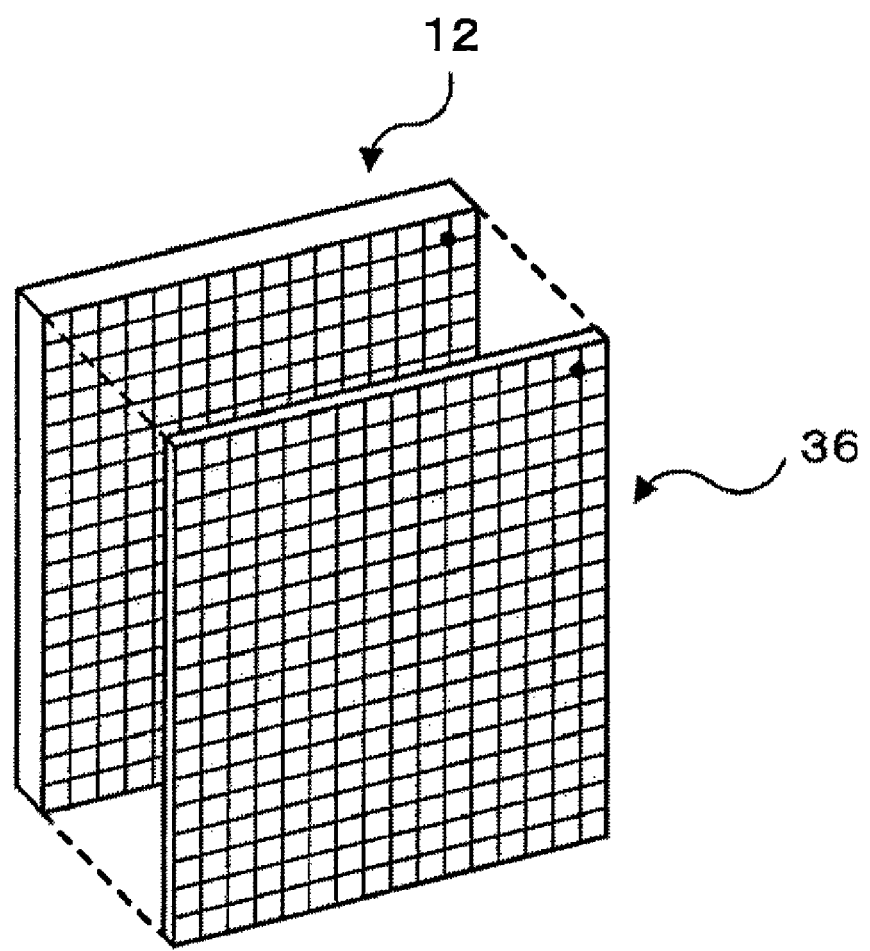
FIG. 4 is a diagram showing a color filter 36 attached to the imaging section 12.

FIG. 4 is a diagram showing a color filter 36 attached to the imaging section 12. Each square of the imaging section 12 is a pixel including a single pixel 29, and each pixel corresponds one-to-one to a square in the color filter 36. Each square of the color filter 36 has a certain color, and various types of color filter 36 are used depending on the color selection and array.

Figures 5A, 5B:
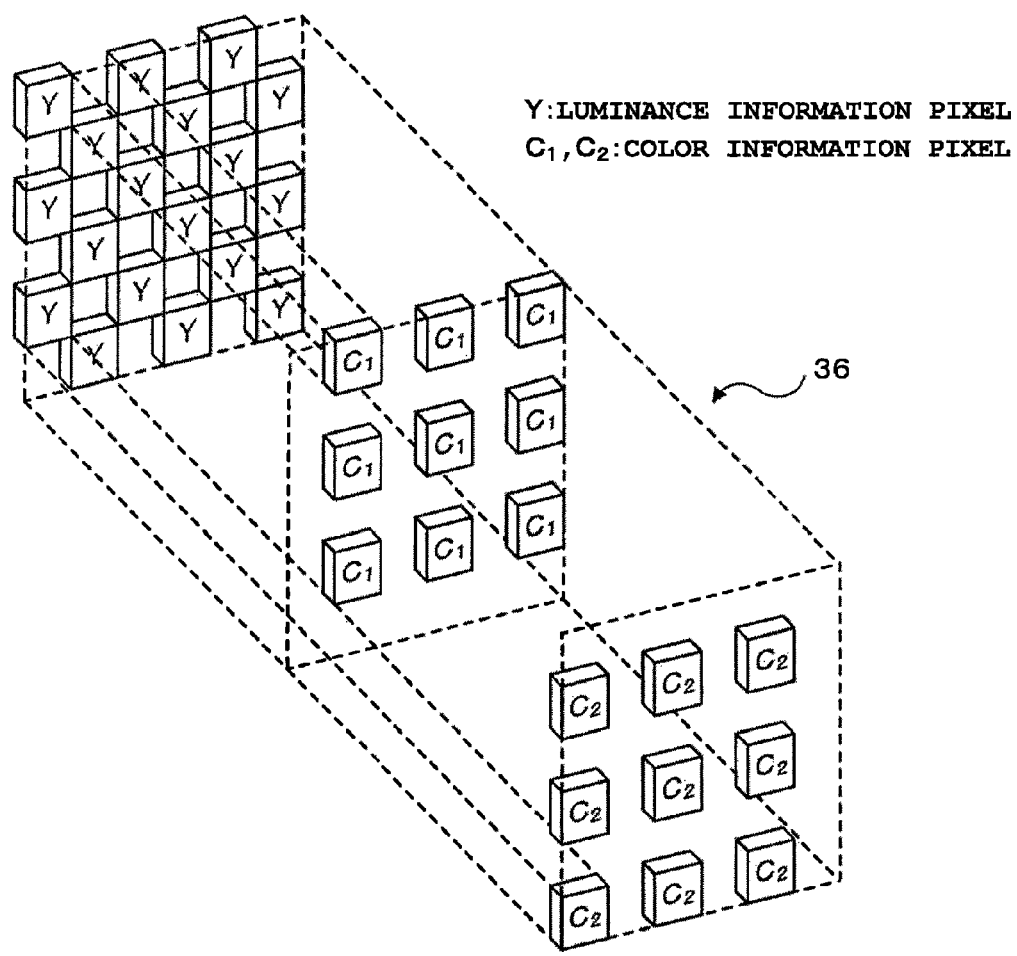
FIG. 5A is a perspective view diagram showing the principle of the color filter 36 of which the arrangement is referred to as Bayer arrangement.
FIG. 5B is a front view diagram showing the principle of the color filter 36 of which the arrangement is referred to as Bayer pattern.

FIG. 5 is a diagram of the principle of the color filter 36 of which the arrangement is referred to as Bayer arrangement. This pattern is widely used because of the balanced signal-to-noise ratio (S/N) regarding color signals and luminance signals, and the excellent color reproduction regardless of the brightness of the subject. In FIG. 5, Y is a filter used to acquire luminance information, and C1 and C2 are filters used to acquire color information. In the Bayer arrangement, the Y filters are arrayed in a checkered pattern, the C1 filters are arranged in the interspaces in the even-numbered lines, and the C2 filters are arranged in the interspaces in the odd-numbered lines. A greater number of Y filters are arranged because, in terms of human vision, luminance information allows better perception of image resolution and contour sharpness than color information.

Figure 6:
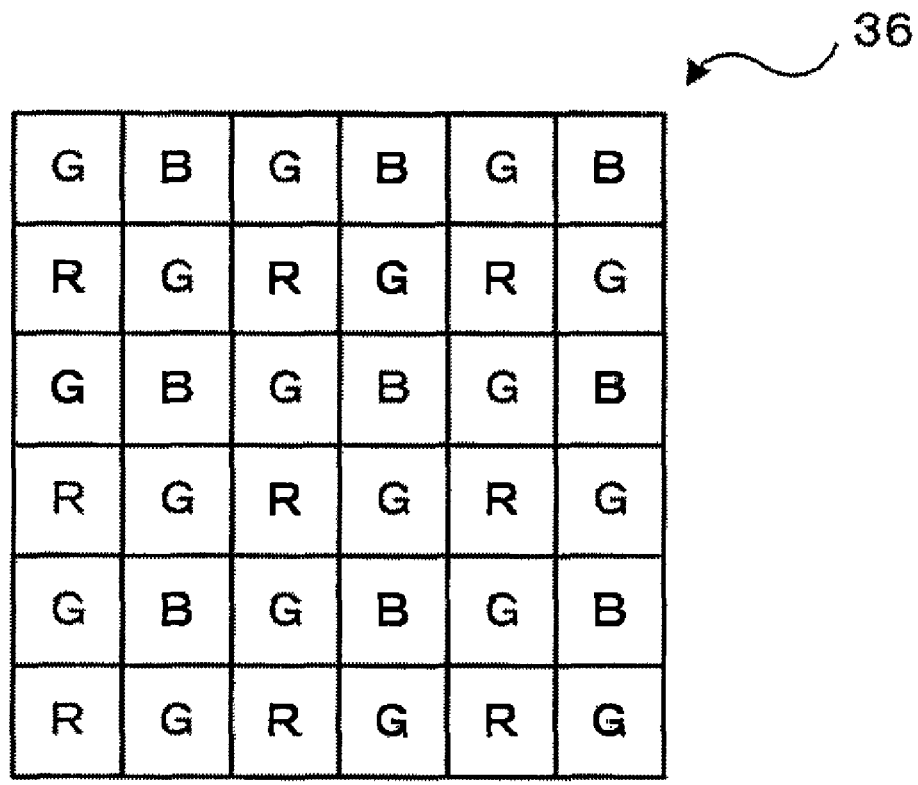
FIG. 6 is a configuration diagram of an actual color filter 36.

FIG. 6 is a diagram showing a configuration of an actual color filter 36. R is a red filter. G is a green filter, and B is a blue filter. Red (R), green (G), and blue (B) are the three primary colors of light, and especially green expresses well the brightness of the subject. Therefore, the G filter is also used as a filter for acquiring luminance information. That is, the G filter corresponds to the Y filter in FIG. 5, and the R filter and the B filter correspond to the C1 filter and the C2 filter in FIG. 5.

Next, operations of the digital camera 1 will be described.

Figure 7:
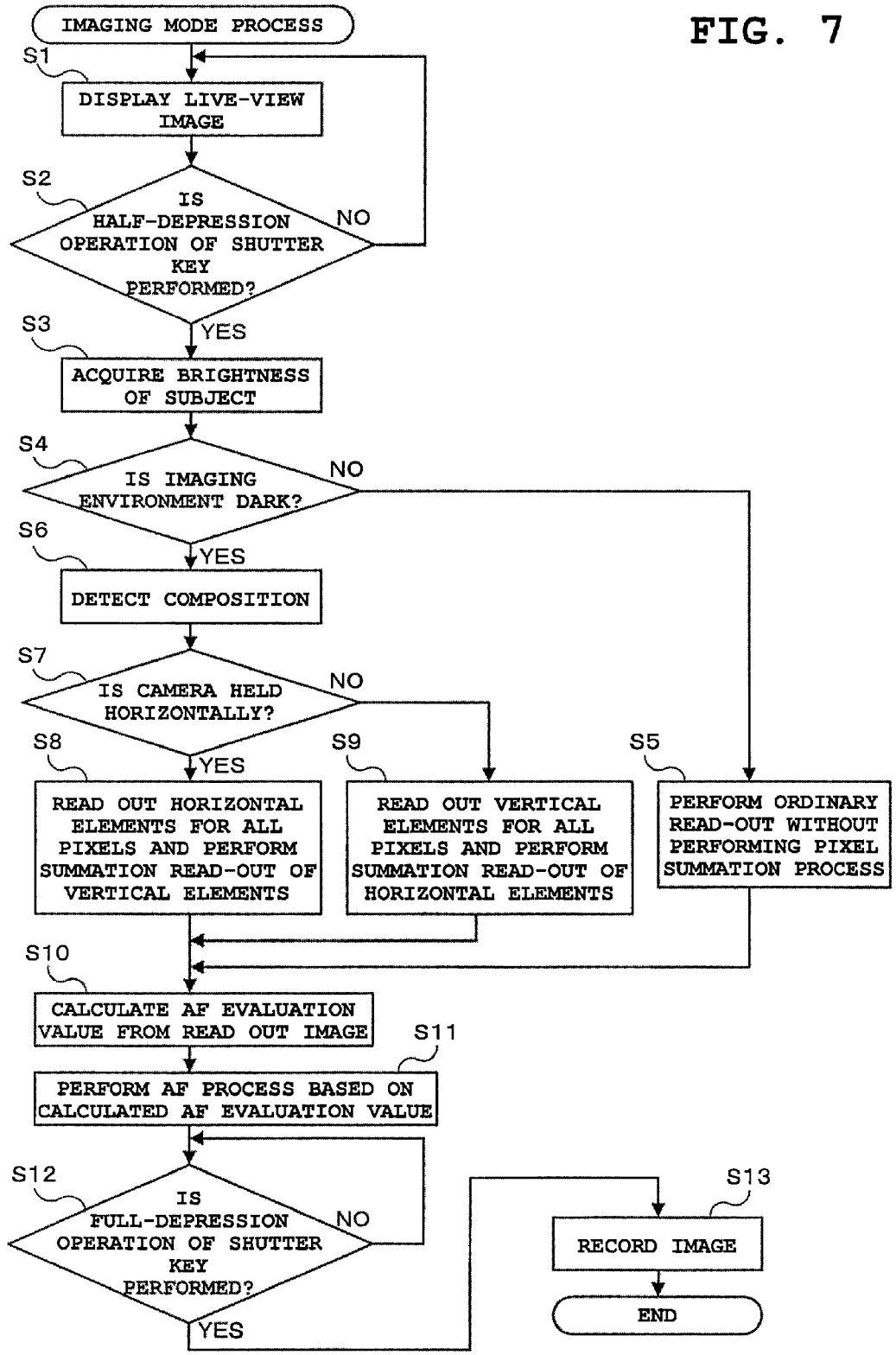
FIG. 7 is a flow diagram of a control program for performing imaging mode processing.

FIG. 7 is a flow diagram of a control program for performing imaging mode processing. This imaging mode processing refers to a series of processing in which, when a half-shutter operation (a half-depression operation of the shutter key 10) by the user is detected while a live-view image for checking composition is displayed in the display section 5, AE, automatic white balance (AWB), and AF operations are performed, and when a full-shutter operation (a full-depression operation of the shutter key 10) by the user is further detected, the image imaged at this time is converted to a joint photographic experts group (JPEG) file, and recorded and stored in the external memory 17.

This control program is stored in the flash memory 19 in advance, and after being loaded to the SDRAM 18, run by the CPU 21.

When the imaging mode processing starts, the CPU 21 first displays frame images (such as a 30 frames of images per second) outputted periodically from the imaging section 12 in the display section 5 as a live-view image for checking composition (Step S1). Then, when the user performs a half-shutter operation (a half-depression operation of the shutter key 10), the CPU 21 detects the brightness of the subject (Step S3) and judges whether or not imaging is performed in a dark environment darker than a predetermined brightness (Step S4).

Here, the brightness of the subject refers to so-called exposure of the subject. This exposure is obtained from, for example, an average luminance of the overall live-view image, an average luminance of a certain area within the image, or a luminance of a certain point within the image, and may be measured using the live-view image or using a separate exposure meter.

When the judgment result at Step S4 is NO or, in other words, when the subject is sufficiently bright, the CPU 21 sequentially reads out pixel information from the imaging section 12 without performing pixel addition processing described hereafter (Step S5). The "sequential readout of pixels information" is hereinafter referred to as an "ordinary readout".

In this "ordinary readout", as described earlier regarding FIG. 3, signal charges collected in the pixels 29 are simultaneously loaded into the adjacent vertical transferring section 30 in response to a readout signal from the vertical/horizontal driver 15. Next, the signal charges are then sequentially transferred within the vertical transferring section 30 in the downward direction in FIG. 3, synchronously with a vertical transfer clock from the vertical/horizontal driver 15. Next, the signal charges loaded into the horizontal transferring section 32 are sequentially transferred in the left-hand direction in FIG. 3, synchronously with the horizontal transfer clock from the vertical/horizontal driver 15. Then, the signal charges which have reached the output end of the horizontal transferring section 32 are converted to electrical signals by the charge detecting section 33 provided on the same output end, and after being amplified by the amplifier 34, outputted from the terminal 35 as CCD output.

On the other hand, when the judgment result at Step S4 is YES or, in other words, imaging is judged to be performed in a dark environment in which the brightness of the subject is darker than a predetermined brightness, the CPU 21 checks the direction of the body 2 of the digital camera 1 according to an output signal from the position sensor 20 and judges whether or not the image composition is "horizontal" (namely, the horizontal image composition) (Step S7).

Next, when judged as the horizontal image composition (YES at Step S7), the CPU 21 reads out all the pixels for the horizontal component pixel information and performs pixel addition readout for the vertical component pixel within the pixel array of the imaging section 12 (Step S8). Conversely, when judged as not being the horizontal image composition (NO at Step S7), the CPU reads out all the pixels for the vertical directions information and performs pixel addition readout of the horizontal component pixel within the pixel array of the imaging section 12 (Step S9.)

That is, depending on the image composition, the CPU 21 reads out all the pixels for the pixel information in the direction including numerous information (contrast components) required to perform auto-focusing (AF). Regarding pixel information in the direction having few contrast components, the CPU 21 performs to pixel addition readout to brighten the image. As a result, high-precision auto-focusing can be performed even in a dark environment.

Then, after Step S5, Step S8, or Step S9, the CPU 21 calculates an AF evaluation value (an evaluation value obtained using a contrast method) from an image readout from the imaging section 12 (Step S10). Next, the CPU 21 performs AF processing according to the calculated AF evaluation value (Step S11). Here, AF processing refers to automatic focusing operation processing for finding a lens position having the highest contrast, while moving the focus lens in the lens block 3A.

When the lens position, namely a focus position, having the highest contrast is found in this way, the user is notified that the image is in focus by an electronic sound, a lamp display, and the like, and the CPU 21 waits for a full-depression operation of the shutter key 10 by the user who has received the notification (Step S12). Next, when the shutter key 10 is fully depressed, the CPU 21 converts an imaged image output from the imaging section 12 at this time into a JPEG file, and after recording and storing the JPEG file in the external memory 17 (Step S13), completes the control program.

Note that, when the judgment result at Step S4 is YES, imaging is judged to be performed in a dark environment in which the brightness of the subject is darker than a predetermined brightness, and according to the embodiment, at subsequent Step S6, the CPU 21 checks the direction of the body 2 of the digital camera 1 according to an output signal from the position sensor 20. However, a step may be included between Step S4 and Step S6 for judging whether or not imaging is performed with a strobe light. In this case, the CPU 21 proceeds to subsequent Step S6 (camera position judgment) only when the use of strobe light is prohibited or when the user does not wish to use the strobe light.

Next, the pixel addition readout is a key point of the embodiment will be described. As described above, according to the embodiment, when imaging is judged to be performed in a dark environment in which the brightness of the subject is darker than a predetermined brightness (YES at Step S4), the CPU 21 performs the "pixel addition readout". However, this "pixel addition readout" differs between the horizontal image composition and the vertical image composition.

Figure 8A:
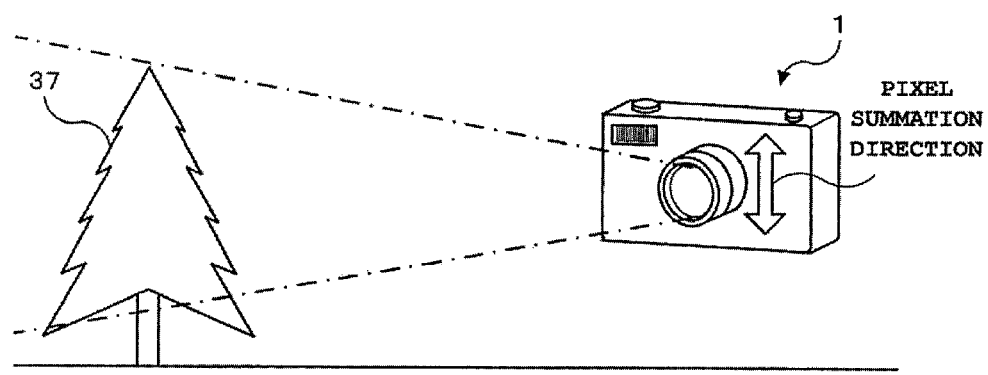
FIG. 8A is a diagram of a horizontal image composition in which the digital camera 1 is held horizontally with respect to a subject 37.
Figure 8B:
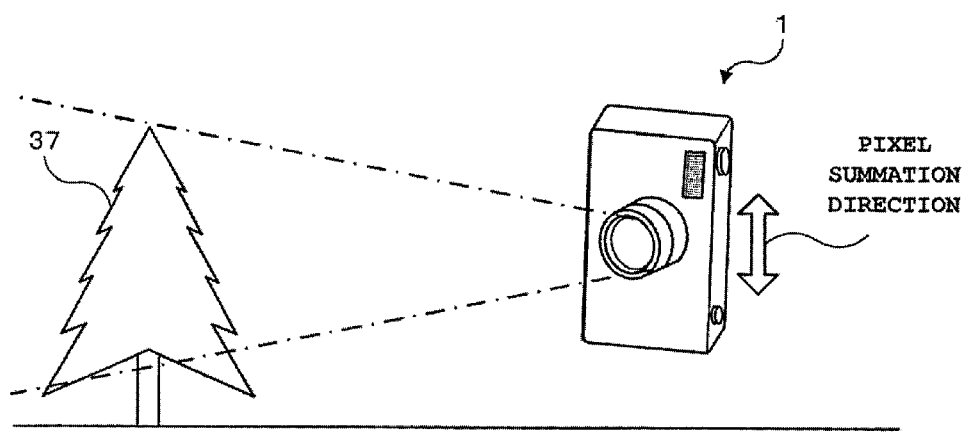
FIG. 8B is a diagram of a vertical image composition in which the digital camera 1 is held vertically with respect to the subject 37.

FIG. 8A and FIG. 8B are diagrams of the image compositions. FIG. 8A shows the horizontal image composition in which the digital camera 1 is held horizontally in with respect to a subject 37. FIG. 8B shows the vertical image composition in which the digital camera 1 is held vertically with respect to the subject 37.

In the horizontal image composition, the CPU 21 reads out all the pixels of horizontal directions information and performs the pixel addition readout of vertical component pixel. In the vertical image composition, the CPU 21 reads out all the pixels of vertical component pixel information and performs the pixel addition readout of horizontal component pixel. That is, the addition direction of pixel information differs depending on the image composition. Note that horizontal directions and vertical directions in the vertical image composition according to the embodiment are directions corresponding to the horizontal direction and the vertical direction during horizontal imaging, rather than the horizontal direction and vertical direction during actual vertical imaging. In other words, the directions of the directions are opposite of the horizontal direction and vertical direction during actual vertical imaging.

Figure 9:
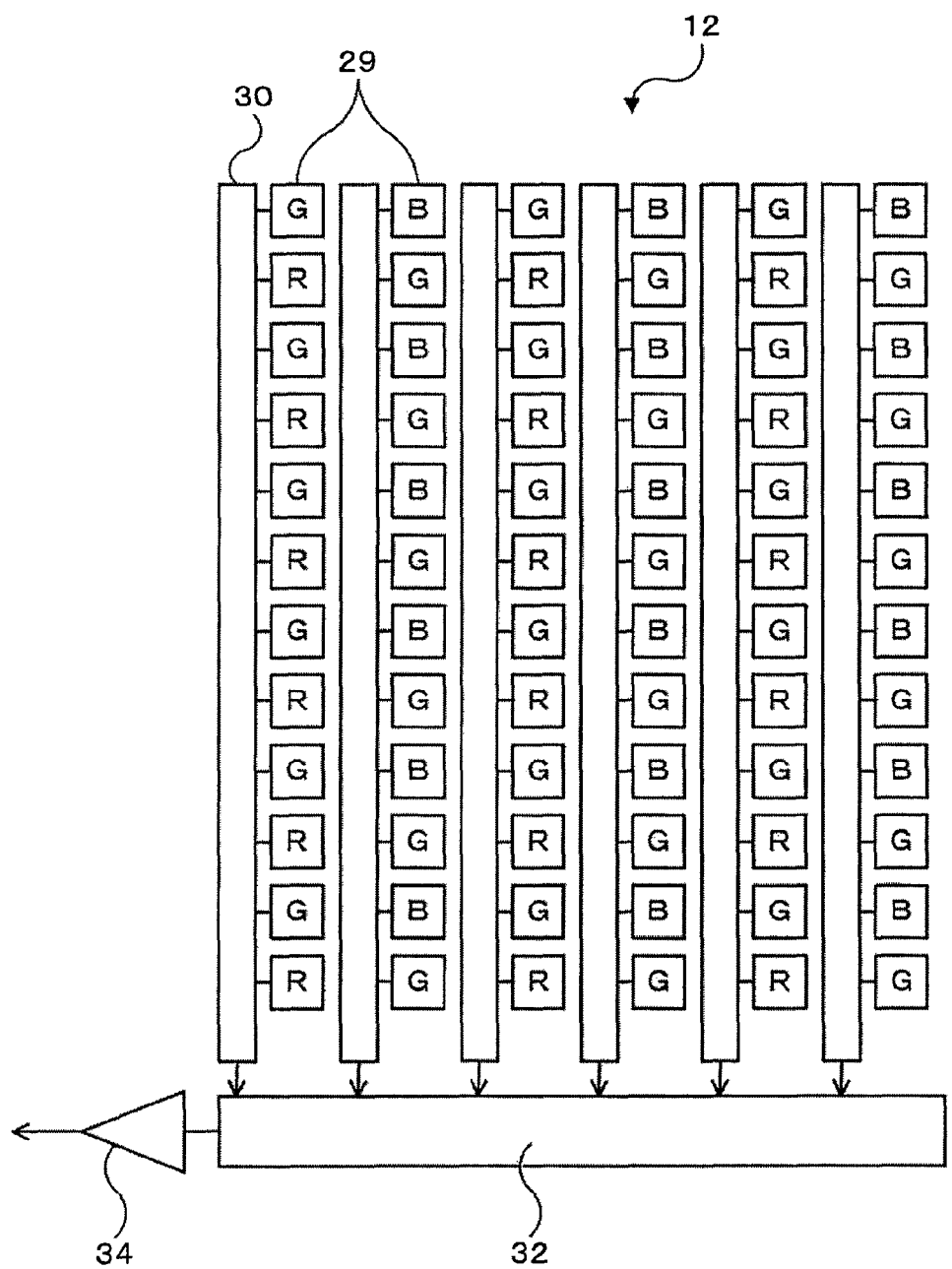
FIG. 9 is a schematic view of the imaging section 12.

FIG. 9 is a schematic view of the imaging section 12. In FIG. 9, the rectangular squares indicate the pixels 29. Each pixel 29 is given a color symbol R, G, or B according to the corresponding color filter (see the color filter 36 in FIG. 4 to FIG. 6). Here, R is red, G is green, and B is blue. As described above, the arrangement of the color filter of the imaging section 12 according to the embodiment is the Bayer arrangement, and as shown in FIG. 9, the color filters are arrayed G, R, G, . . . , B, G, B, . . . from top to bottom for each column. The vertical transferring section 30 is arranged between columns. The horizontal transferring section 32 is arranged on the bottommost end. The amplifier 34 is connected to an output section of the horizontal transferring section 32.

<Pixel Addition During Horizontal Imaging>

Figure 10A:
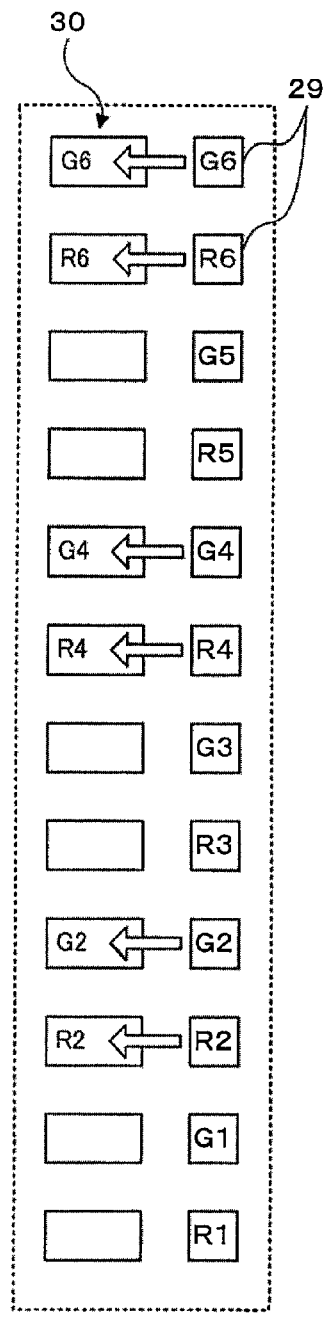
FIG. 10A is a conceptual diagram of pixel addition during horizontal imaging (vertical-direction pixel addition) indicating a pixel readout status at time T1.
Figure 10B:
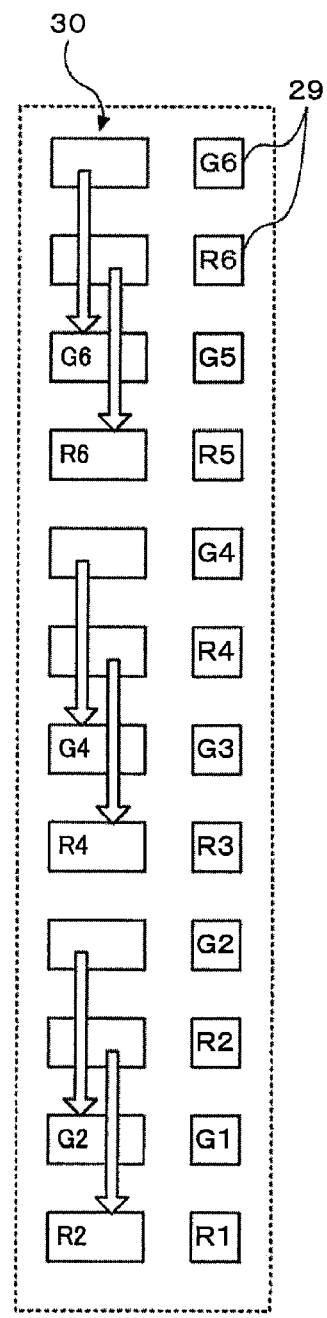
FIG. 10B is a conceptual diagram of pixel addition during horizontal imaging (vertical-direction pixel addition) indicating a pixel readout status at time T2 following time T1.
Figure 10C:
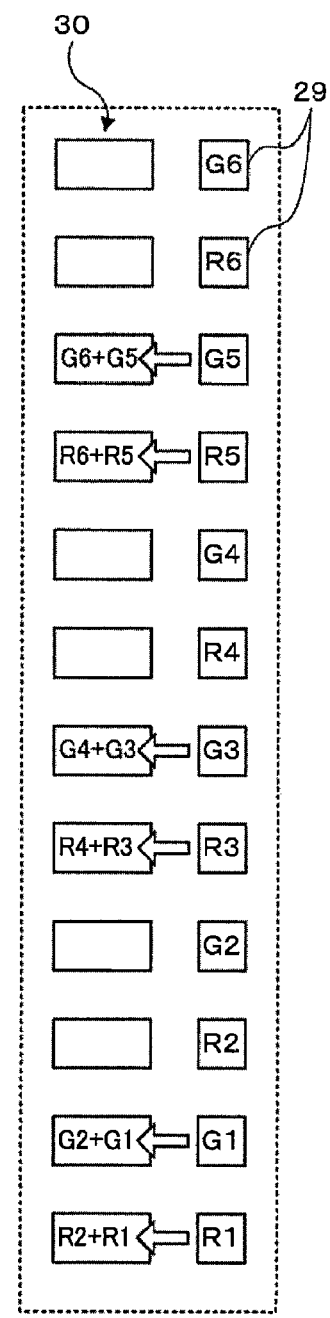
FIG. 10C is a conceptual diagram of pixel addition during horizontal imaging (vertical-direction pixel addition) indicating a pixel readout status at time T3 following time T2.

FIG. 10A to FIG. 10C are conceptual diagrams of pixel addition during horizontal imaging (vertical-direction pixel addition).

FIG. 10A shows a pixel readout status at time T1, FIG. 10B shows a pixel readout status at time T2 following time T1, and FIG. 10C shows a pixel readout status at time T3 following time T2. FIG. 10A to FIG. 10C are operation concepts of one of columns constituting the imaging section 12. Here, for convenience, G6, R6, G5, R5, . . . , G1, and R1 written within the squares of the pixels 29 respectively indicate a sixth green pixel, a sixth red pixel, a fifth green pixel, a fifth red pixel, . . . , a first green pixel, and a first red pixel of each column. The horizontal rectangles vertically aligned to the left of the pixels 29 respectively indicate each transfer element of the vertical transferring sections 30.

As shown in FIG. 10A to FIG. 10C, at the first time T1, the signal charges of each pixel 29 indicated by G6, R6, G4, R4, G2, and R2 are readout to the vertical transferring sections 30. At the subsequent time T2, the signal charges readout to the vertical transferring sections 30 are transferred two rows down. At the third time T3, the signal charges of each pixel 29 indicated by G5, R5, G3, R3, G1, and R1 are newly readout to the vertical transferring sections 30. Then, the previously readout signal charges (G6, R6, G4, R4, G2, and R2) and the currently readout signal charges (G5, R5, G3, R3, G1, and R1) are added in the vertical transferring sections 30. As a result, pixel addition results for two pixels, G6+G5, R6+R5, G4+G3, R4+R3, G2+G1, and R2+R1, are obtained. These pixel addition results are outputted externally from the vertical transferring section 32 via the amplifier 34, in pixel units.

As just described, in pixel addition during horizontal imaging, the CPU 21 reads out all the pixels for the horizontal component pixel and performs pixel addition readout of the vertical component pixel within the pixel array of the imaging section 21.

<Pixel Addition During Vertical Imaging>

Figure 11A:
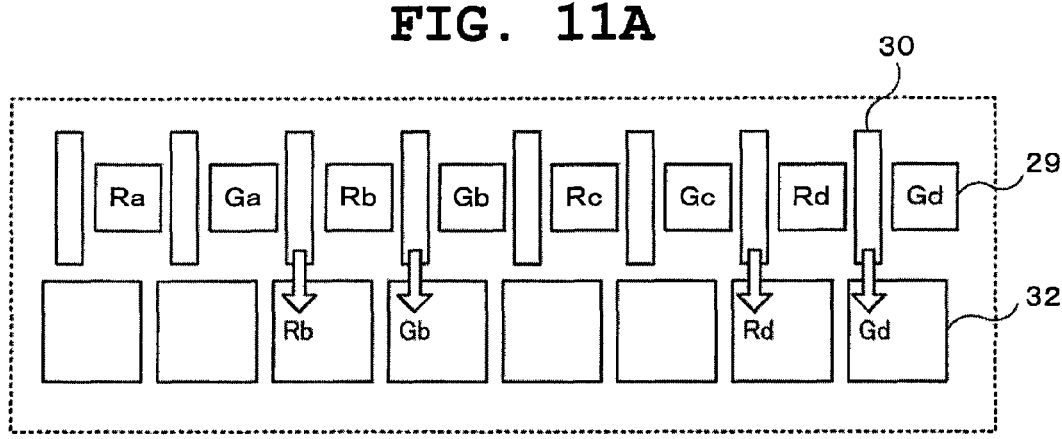
FIG. 11A is a conceptual diagram of pixel addition during vertical imaging (horizontal-direction pixel addition) indicating a pixel readout status at time T1.
Figure 11B:
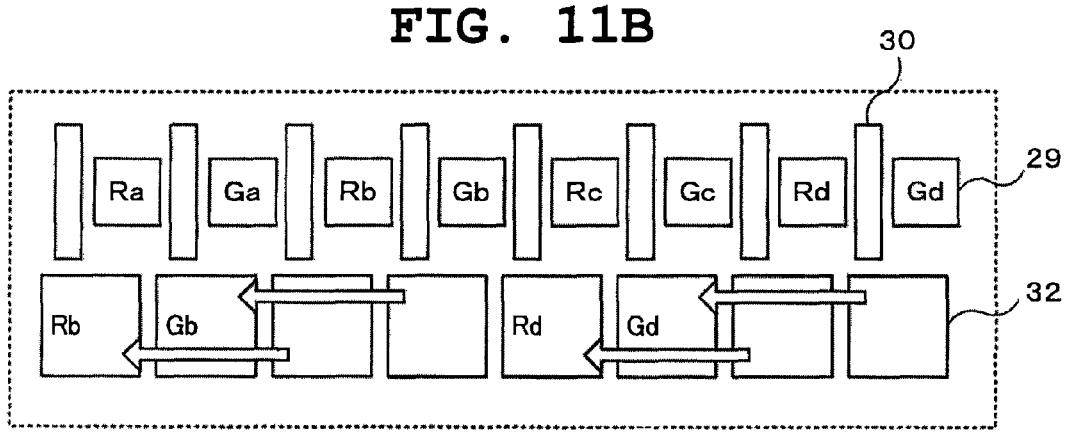
FIG. 11B is a conceptual diagram of pixel addition during vertical imaging (horizontal-direction pixel addition) indicating a pixel readout status at time T2 following time T1.
Figure 11C:
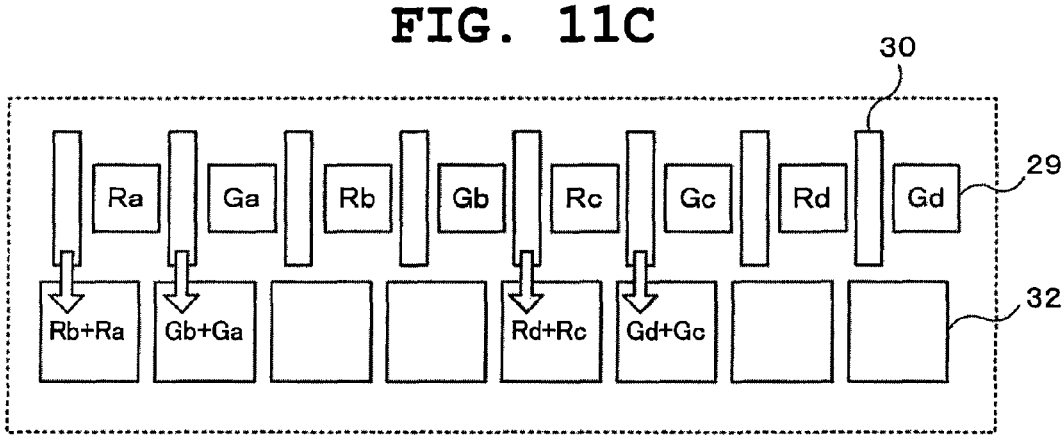
FIG. 11C is a conceptual diagram of pixel addition during vertical imaging (horizontal-direction pixel addition) indicating a pixel readout status at time T3 following time T2.

FIG. 11A to FIG. 11C are conceptual diagrams of pixel addition during vertical imaging (horizontal-direction pixel addition).

Among these diagrams, FIG. 11A shows a pixel readout status at time T1, FIG. 11B shows a pixel readout status at time T2 following time T1, and FIG. 11C shows a pixel readout status at time T3 following time T2. FIG. 11A to FIG. 11C are operation concepts of one of rows constituting the imaging section 12. Here, for convenience, Ra, Ga, Rb, Gb, . . . , Rd, and Gd written within the squares of the pixels 29 respectively indicate an a-th red pixel, an a-th green pixel, a b-th red pixel, a b-th green pixel, . . . , a d-th red pixel, and a d-th green pixel of each row. The horizontal rectangles laterally aligned below the pixels 29 respectively indicate each transfer element of the horizontal transferring section 32.

As shown in FIG. 11A to FIG. 11C, at the first time T1, the signal charges of each pixel 29 indicated by Rb, Gb, Rd, and Gd are readout to the horizontal transferring sections 32. At the subsequent time T2, the signal charges readout to the horizontal transferring section 32 are transferred two columns to the left. At the third time T3, the signal charges of each pixel 29 indicated by Ra, Ga, Re, and Ge are newly readout to the horizontal transferring section 32. Then, the previously readout signal charges (Rb, Gb, Rd, and Gd) and the currently readout signal charges (Ra, Ga, Re, and Ge) are added in the horizontal transferring section 32. As a result, pixel addition results for two pixels, Rb+Ra, Gb+Ga, Rc+Rd, and Gc+Gd, are obtained. These pixel addition results are outputted externally from the horizontal transferring section 32 via the amplifier 34, in pixel units.

As just described, in pixel addition during vertical imaging, the CPU 21 reads out all the pixels for the vertical directions and performs pixel addition readout of the horizontal directions within the pixel array of the imaging section 21. As a result, even when a subject that is said to include more vertical lines during horizontal imaging is imaged by vertical imaging, the subject is detected with high contrast, and a unique effect is achieved in that auto-focusing operations are successfully performed during imaging in a dark environment.

Figure 13A:
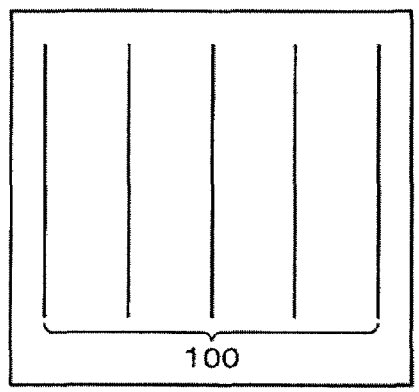
FIG. 13A to FIG. 13C are comparison diagrams of a conventional technology and the present invention.
Figure 13B:
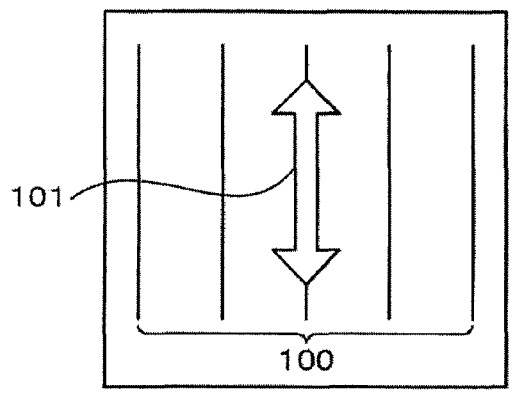
Figure 13C:
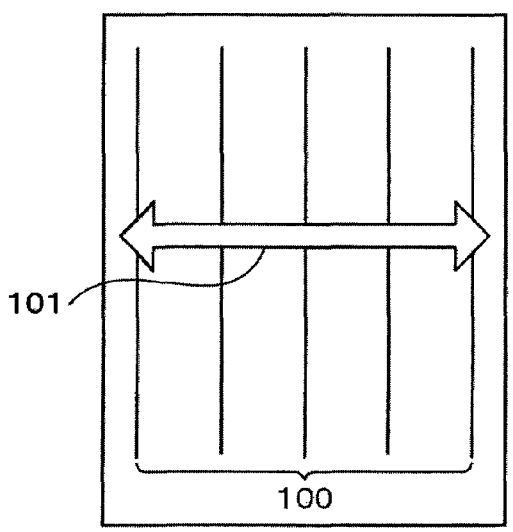

Specifically, when a subject that is said to include more vertical lines during horizontal imaging is imaged by vertical imaging, in the conventional technology, a "vertical pixel addition" direction 101 is perpendicular to a plurality of vertical lines 100 as shown in FIG. 13C. Therefore, there is a problem in that, although the image is brightened, detection is not performed with high contrast because detection is performed with contrast according to pixel information of a direction parallel to the plurality of vertical lines 100. However, according to the embodiment, when vertical imaging is performed, "horizontal pixel addition" is performed instead of "vertical pixel addition" (see FIG. 11A to FIG. 11C). Accordingly, even when a subject that is includes more vertical lines during horizontal imaging is imaged by vertical imaging, a parallel relationship can be established between the plurality of vertical lines 100 and the "horizontal pixel addition" direction 101 as shown in FIG. 11B. Therefore, it is possible to perform pixel addition readout of pixel information in the direction having few contrast components to brighten the image, and readout all the pixels for pixel information in the direction having high contrast. As a result, the plurality of vertical lines 100 can be detected with high contrast.

Therefore, according to the embodiment, a unique effect is achieved in that auto-focusing operations are successfully performed during imaging in a dark environment, regardless of the image composition.

Figure 12:
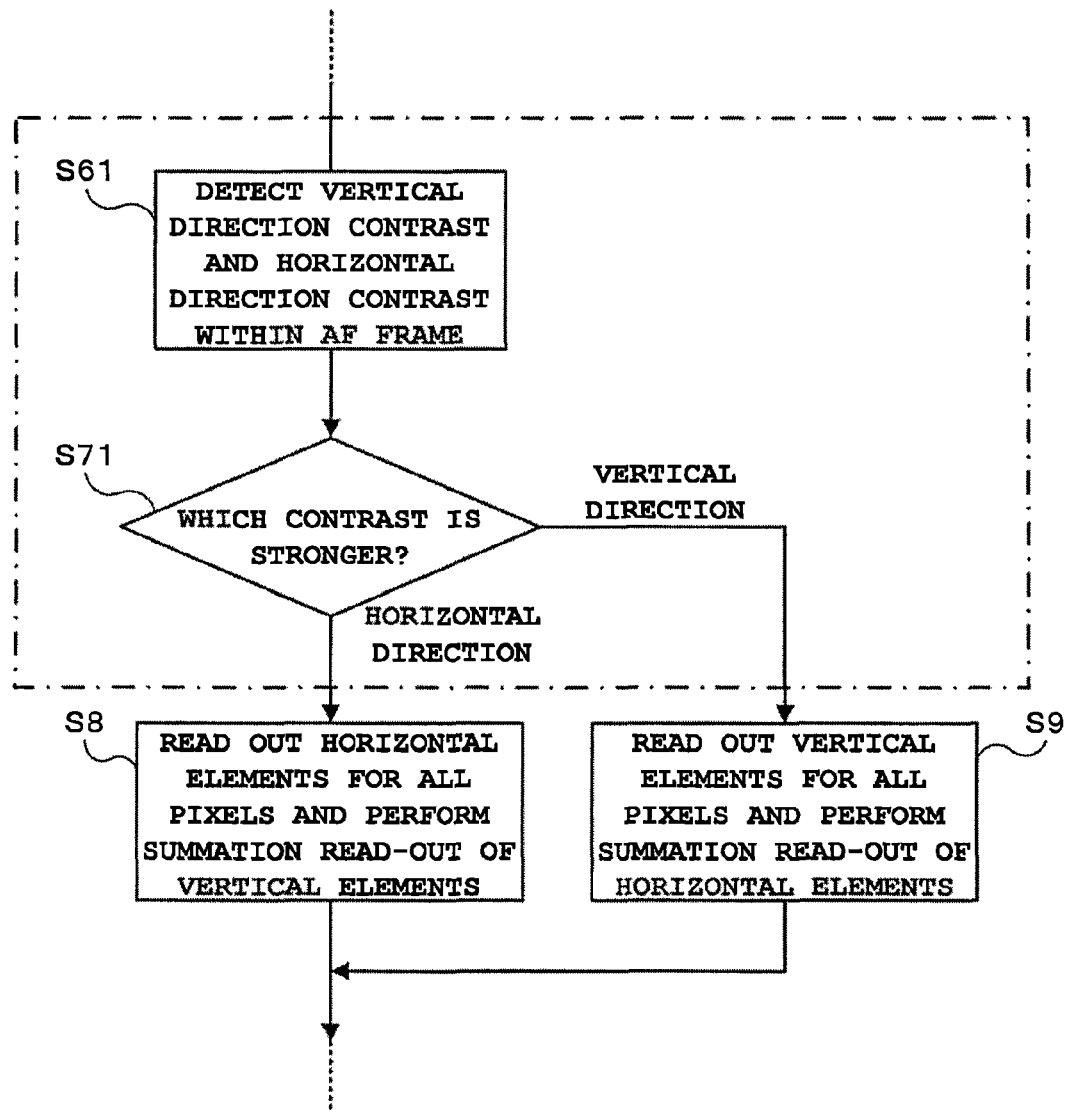
FIG. 12 is a diagram showing a modified embodiment.

FIG. 12 is a diagram showing a variation example of essential portions of the control program (see FIG. 7).

The control program in FIG. 12 differs from the above-described control program (see FIG. 7) in that Step S61 for detecting vertical direction contrast and horizontal direction contrast and Step S71 for determining the higher of the two contrasts are included instead of Step S6 (step for detecting camera position) of the above-described control program. Here, contrast detection and judgment are performed according to a main portion within a live-view image, such as an image within an auto-focusing frame (AF frame).

When the judgment result at Step S71 is YES, in other words, when the "horizontal direction" contrast is high, the CPU 21 "reads out all the pixels for the horizontal components and performs pixel addition readout of the vertical components" (Step S8). On the other hand, when the judgment result at Step S71 is NO, in other words, when the "vertical direction" contrast is high, the CPU 21 "reads out all the pixels for the vertical components and performs pixel addition readout of the horizontal components" (Step S9).

As a result, "reading out of all the pixels for the horizontal components and addition readout of the vertical components" (Step S8) and "reading out of all the pixels for the vertical components and addition readout of the horizontal components" (Step S9) can be selectively performed depending on the actual subject. That is, "reading out of all the pixels for the horizontal components and addition readout of the vertical components" is performed when the actual subject has high horizontal direction contrast, and "reading out of all the pixels for the vertical components and addition readout of the horizontal components" is performed when the actual subject has high vertical direction contrast. As a result, pixel information in the direction having few contrast components is used in pixel addition to bright the image, and all the pixels are read out of pixel information in the direction having many contrast components. Accordingly, highly precise contrast detection is performed even when imaging is performed in a dark environment. Therefore, an excellent effect is achieved in that auto-focusing operations are successfully performed in a dark environment regardless of differences in subjects and differences in image compositions.

According to the embodiment and in the variation example, "reading out of all pixels for horizontal components and addition readout of vertical components" or "reading out of all pixels for vertical components and addition readout of horizontal components" is performed. However, present invention is not limited thereto. It is only required that this is a method of reading out pixel information that allows improvement in the precision of auto-focusing performed using the contrast method.

In the variation example, vertical direction contrast and horizontal direction contrast within an AF frame are detected, and the higher of the two contrasts is determined. However, a subject detecting means for detecting the subject may be provided. In this case, the vertical direction contrast and the horizontal direction contrast of the detected subject are detected, and the higher of the two contrasts are determined.

Moreover, addition readout of horizontal pixels or vertical pixels may be performed for images used for recording, in addition to during auto-focusing operations.

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
an imaging section which images a subject and comprises plurality of pixels arrayed in a vertical direction and a horizontal direction;
detecting means for detecting whether the imaging apparatus including the imaging section is held vertically or horizontally;
readout means for reading out pixel information of the plurality of the pixels from the imaging section;
readout controlling means for controlling a readout process of the pixel information executed by the readout means, in accordance with a detection result from the detecting means;
calculating means for calculating an auto-focus evaluation value in accordance with the pixel information read out by the readout controlling means; and
focusing means for focusing in accordance with the auto-focus evaluation value calculated by the calculating means;
wherein the readout controlling means includes first addition readout controlling means for controlling the readout means to execute a pixel addition process of the pixel information of a plurality of pixels in the vertical direction, when the detecting means detects that the imaging apparatus is held horizontally, and second addition readout controlling means for controlling the readout means to execute a pixel addition process of the pixel information of a plurality of pixels in the horizontal direction, when the detecting means detects that the imaging apparatus is held vertically.

2. The imaging apparatus according to claim 1, wherein the first addition readout controlling means further controls the readout means to read out the pixel information of all pixels in the horizontal direction, and the second addition readout controlling means further controls the readout means to read out the pixel information of all pixels in the vertical direction.

3. The imaging apparatus according to claim 1, further comprising:
   judging means for judging whether a brightness of a subject is not more than a predetermined value;
   wherein the readout controlling means controls the readout means to read out the pixel information in accordance with the detection result from the detecting means, when the judging means judges that the brightness of the subject is the predetermined value or less.

4. An imaging apparatus comprising:
   an imaging section which images a subject and comprises a plurality of pixels arrayed in a vertical direction and a horizontal direction;
   contrast detecting means for detecting vertical direction contrast and horizontal direction contrast of an image imaged by the imaging section;
   readout means for reading out pixel information of the plurality of the pixels from the imaging section;
   readout controlling means for controlling a readout process of the pixel information executed by the readout means, in accordance with a detection result from the contrast detecting means;
   calculating means for calculating an auto-focus evaluation value in accordance with the pixel information read out by readout controlling means; and
   focusing means for focusing in accordance with the auto-focus evaluation value calculated by the calculating means;
   wherein the readout controlling means includes first addition readout controlling means for controlling the readout means to execute a pixel addition process of the pixel information of the horizontal direction when the vertical direction contrast is higher than the horizontal direction contrast, and second addition readout controlling means for controlling the readout means to execute a pixel addition process of the pixel information of the vertical direction when the horizontal direction contrast is higher than the vertical direction contrast.

5. The imaging apparatus according to claim 4, wherein the first addition readout controlling means further controls the readout means to read out pixel information of all pixels in the vertical direction, and the second addition readout controlling means further controls the readout means to read out pixel information of all pixels in the horizontal direction.

6. The imaging apparatus according to claim 4, further comprising:
   judging means for judging whether a brightness of a subject is not more than a predetermined value;
   wherein the readout controlling means controls the readout means to read out the pixel information in accordance with the detection result from the detecting means when the judging means judges the brightness of the subject is the predetermined value or less.

7. An auto-focusing method of an imaging apparatus including an imaging section which images a subject and comprises a plurality of pixels arrayed in a vertical direction and a horizontal direction, the method comprising:
   a detecting step of detecting whether the imaging apparatus is held vertically or horizontally;
   a readout step for reading out pixel information of the plurality of the pixels from the imaging section;
   a readout controlling step of controlling a readout process of the pixel information executed in the readout step, in accordance with a detection result in the detecting step;
   a calculating step of calculating an auto-focus evaluation value according to the pixel information read out in the readout controlling step; and
   a focusing step of focusing in accordance with the auto-focus evaluation value calculated in the calculating step;
   wherein the readout controlling step includes a first addition readout controlling step of controlling the readout process to execute a pixel addition process of the pixel information of a plurality of pixels in the vertical direction, when it is detected by the detecting step that the imaging apparatus is held horizontally, and a second addition readout controlling step of controlling the readout process to execute a pixel addition process of the pixel information of a plurality of pixels in the horizontal direction, when it is detected by the detecting step detect that the imaging apparatus is held vertically.

8. An auto-focusing method of an imaging apparatus including an imaging section which images a subject and comprises a plurality of pixels arrayed in a vertical direction and a horizontal direction, the method comprising:
   a detecting step of detecting vertical direction contrast and horizontal direction contrast in an image imaged by the imaging section;
   a readout step for reading out pixel information of the plurality of the pixels from the imaging section;
   a readout controlling step of controlling a readout process of the pixel information executed in the readout step, in accordance with a detection result in the detecting step;
   a calculating step of calculating an auto-focus evaluation value in accordance with the pixel information read out in the readout controlling step; and
   a focusing step of focusing in accordance with the auto-focus evaluation value calculated by the calculating step;
   wherein the readout controlling step includes a first addition readout controlling step of controlling the readout process to execute a pixel addition process of the pixel information of the horizontal direction when the vertical direction contrast is higher than the horizontal direction contrast, and a second addition readout controlling step of controlling the readout means to execute a pixel addition process of the pixel information of the vertical direction when the horizontal direction contrast is higher than the vertical direction contrast.

9. A non-transitory computer-readable storage medium having stored thereon a program that is executable by a computer in an imaging apparatus including an imaging section which images a subject and comprises a plurality of pixels arrayed in a vertical direction and a horizontal direction, the program being executable by the computer to perform a process comprising:
   detection processing for detecting whether the imaging apparatus including the imaging section is held vertically or horizontally;
   readout processing for reading out pixel information of the plurality of the pixels from the imaging section;
   readout control processing for controlling a readout process of the pixel information executed by the readout processing, in accordance with a detection result of the detection processing;

calculation processing for calculating an auto-focus evaluation value in accordance with the pixel information read out by the readout control processing; and focus processing for focusing in accordance with the auto-focus evaluation value calculated by the calculation processing;

wherein the readout control processing includes first addition readout control processing for controlling the readout processing to execute a pixel addition process of the pixel information of a plurality of pixels in the vertical direction, when the detecting processing detects that the imaging apparatus is held horizontally, and second addition readout control processing for controlling the readout processing to execute a pixel addition process of the pixel information of a plurality of pixels in the horizontal direction, when the detecting processing detects that the imaging apparatus is held vertically.

10. A non-transitory computer-readable storage medium having stored thereon a program that is executable by a computer in an imaging apparatus including an imaging section which images a subject and comprises a plurality of pixels are arrayed in a vertical direction and a horizontal direction, the program being executable by the computer to perform a process comprising:

readout processing for reading out pixel information of the plurality of the pixels from the imaging section;

contrast detection processing for detecting vertical direction contrast and horizontal direction contrast of an image imaged by the imaging section;

readout control processing for controlling a readout process of the pixel information executed by the readout processing, in accordance with a detection result of the contrast detection processing;

calculation processing for calculating an auto-focus evaluation value in accordance with the pixel information read out by the readout control processing; and focus processing for focusing in accordance with the auto-focus evaluation value calculated by the calculation processing;

wherein the readout control processing includes first addition readout control processing for controlling the readout processing to execute a pixel addition process of the pixel information of the horizontal direction when the vertical direction contrast is higher than the horizontal direction contrast, and second addition readout control processing for controlling the readout processing to execute a pixel addition process of the pixel information of the vertical direction when the horizontal direction contrast is higher than the vertical direction contrast.

* * * * *

UNITED STATES PATENT AND TRADEMARK OFFICE
CERTIFICATE OF CORRECTION

| | | |
|---|---|---|
| PATENT NO. | : 8,223,255 B2 | Page 1 of 1 |
| APPLICATION NO. | : 12/709651 | |
| DATED | : July 17, 2012 | |
| INVENTOR(S) | : Masami Yuyama | |

It is certified that error appears in the above-identified patent and that said Letters Patent is hereby corrected as shown below:

Column 1, Line 8:

Replace "No" with --No.--.

Column 12, Line 42; Claim 1, Line 2:

Delete "comprises" and insert --comprises a--.

Column 13, Line 35; Claim 4, Line 16:

Delete "by" and insert --by the--.

Column 15, Line 20; Claim 10, Line 4:

Delete "pixels are" and insert --pixels--.

Signed and Sealed this
Fourth Day of December, 2012

David J. Kappos
*Director of the United States Patent and Trademark Office*